No. 686,419. Patented Nov. 12, 1901.
E. D. PAGE.
CONDUIT FOR ELECTRIC WIRES.
(Application filed Apr. 2, 1901.)
(No Model.)
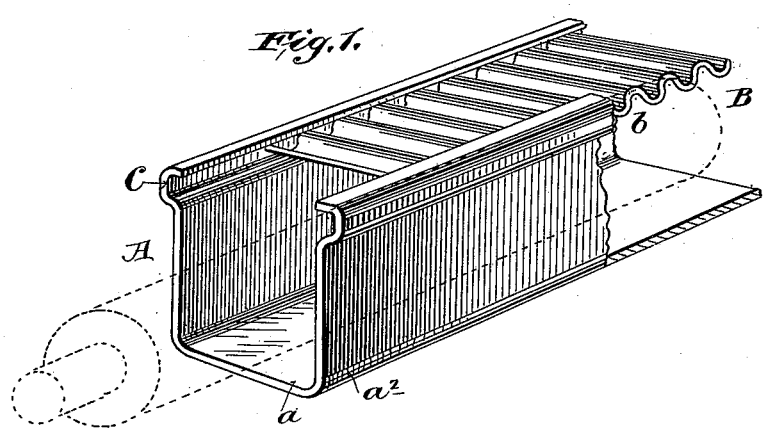
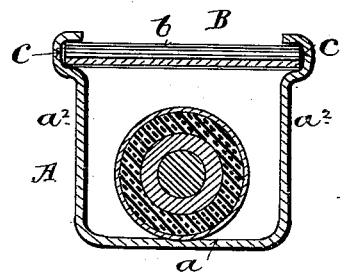
Witnesses,
C. W. Benjamin
M. Manning
Inventor:
Emmett D. Page
by P. F. Bourne
his atty

UNITED STATES PATENT OFFICE.

EMMETT D. PAGE, OF BROOKLYN, NEW YORK, ASSIGNOR OF ONE-HALF TO GEORGE A. LUTZ, OF NEW YORK, N. Y.

CONDUIT FOR ELECTRIC WIRES.

SPECIFICATION forming part of Letters Patent No. 686,419, dated November 12, 1901.

Application filed April 2, 1901. Serial No. 54,021. (No model.)

*To all whom it may concern:*

Be it known that I, EMMETT D. PAGE, a citizen of the United States, residing in New York city, borough of Brooklyn, State of New York, have invented certain new and useful Improvements in Conduits for Electric Wires, of which the following is a specification.

My invention relates to improvements in the class of conduits shown in United States Letters Patent No. 667,567, issued to me on February 5, 1901, for improvements in conduits, &c.; and the object of my present invention is to improve the cover of the conduit, so that it not only may be bent sidewise when being withdrawn from or inserted into the supporting parts of the conduits, but will be strengthened to resist blows, pressure, and the like.

The invention consists in the novel details of improvement that will be hereinafter set forth and then pointed out in the claims.

Reference is to be had to the accompanying drawings, forming part hereof, wherein—

Figure 1 is a perspective view, partly broken, of a conduit embodying my invention; and Fig. 2 is a cross-section thereof.

In the drawings the letter A indicates the conduit proper, which is shown substantially in trough form, having a bottom $a$ and side walls $a^2$, and B is the cover. The conduit is preferably made of sheet metal bent to the desired shape, and the outer edges of the side walls are provided with opposed longitudinally-extending grooves $c$, adapted to receive the corresponding edges of the cover B. The grooves $c$ are preferably formed by bending the metal of the sides $a^2$ into suitable shape, as shown, so that the outer webs or edges will overlie the edges of the cover and the cover will lie upon the underlying laterally-extending portions of the grooves. The cover B is made of relatively thin metal and is corrugated or grooved transversely at $b$, the depth of the grooves $c$ being such as to receive such grooved or corrugated portion of the cover, as shown in Fig. 2. By having the cover B corrugated it can be bent outwardly or in a direction substantially perpendicular to its length, so as to be readily withdrawn from the grooves in the conduit or can be straightened out as it is pushed into said grooves, while at the same time the transverse corrugations tend to stiffen the cover, so that it will resist pressure and blows. By preference the outer webs of the grooves $c$ will be made pliable, whereby they can be bent outwardly to enable a portion of the cover to be inserted at or removed from any desired part of the conduit, and as the cover can be readily bent it will be apparent that it can be connected with or disconnected from the grooves at such points by sliding it into and from the grooves. The grooves of the conduit hold the cover firmly upon the same and all the advantages in the form of conduit shown in my said patent are present in this invention, with the additional advantage of the cover being strengthened, while at the same time being permitted to be readily bent when being applied or detached. The conduit and the cover when made of metal can be used as a grounded circuit, and one or more electric wires can be placed in the conduit, according to dimensions. In Fig. 2 I have shown one insulated wire in the conduit. It is also evident that more than one channel or duct can be made in the conduit, as illustrated in my said patent.

The conduit can be applied to a support by nailing or screwing it thereto, and after the wires are laid in the same the cover can be applied. Any part of the wires in the conduit can be reached readily by bending outwardly the webs of grooves and cutting the adjacent part of the cover transversely and then pulling the same outwardly from the grooves and bending the same as it is withdrawn. The cover can also be removed when the part of the wire to be reached is near an abutment, owing to the bending qualities of the cover.

Having now described my invention, what I claim is—

1. A conduit adapted to receive one or more wires or the like and provided with a cover having transverse grooves or corrugations to permit the cover to be bent laterally, and means for holding the cover upon the conduit, substantially as described.

2. A conduit adapted to receive one or more wires or the like and provided with a cover having transverse grooves or corrugations adapted to permit the cover to be bent laterally, said conduit having longitudinally-extending opposed grooves to receive the edges of the cover, whereby the latter may be slid along the conduit, substantially as described.

EMMETT D. PAGE.

Witnesses:
T. F. BOURNE,
M. MANNING.